Nov. 21, 1939.        W. L. TAYLOR        2,180,781
FISHING TACKLE
Filed Oct. 26, 1938
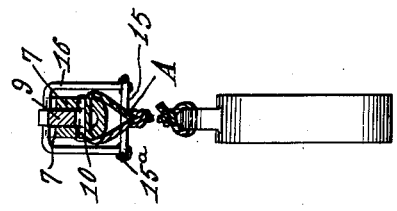
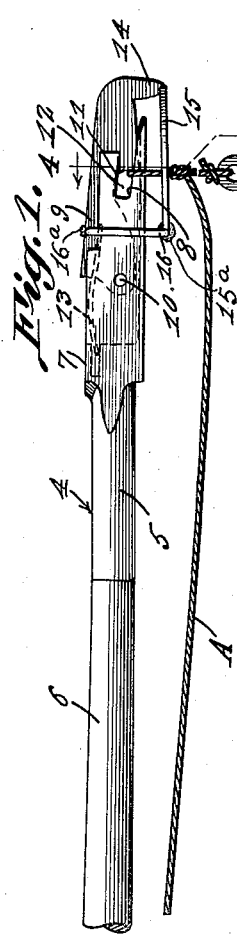
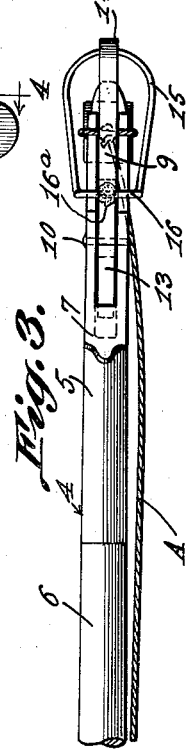
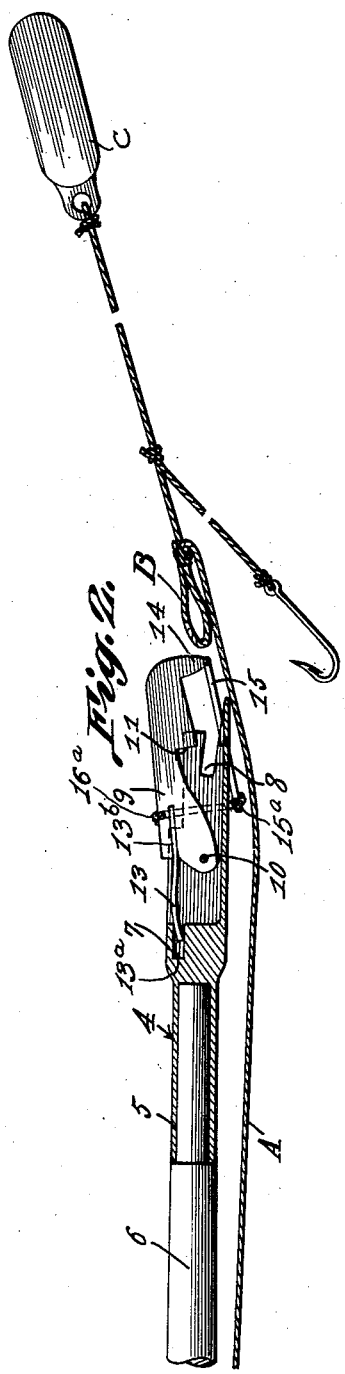
William L. Taylor, INVENTOR
BY Victor J. Evans & Co.
ATTORNEYS Patented Nov. 21, 1939

2,180,781

UNITED STATES PATENT OFFICE 2,180,781

FISHING TACKLE

William L. Taylor, Roanoke, Va.

Application October 26, 1938, Serial No. 237,093

3 Claims. (Cl. 43—19)

My invention relates to fishing tackle and more particularly to a caster or a catapult for a fishing line and has as one of the principal objects thereof the provision of such a device whereby one is enabled to cast the fishing line a considerable distance and avoid the necessity of making the usual wide sweep with the fishing rod.

Another object of my invention is to provide a device of the character described which is simple in construction, durable in use, efficient in operation and economical in manufacture.

A further object of my invention is to provide a device of the character described which can be readily attached to fishing rods already in use without substantially modifying the same.

Other objects and advantages will be apparent from the following description, appended claims and annexed drawing.

Referring to the drawing wherein like reference characters designate like parts throughout the several views:

Figure 1 is a side elevation of a fishing rod illustrating my invention applied thereto, the parts being arranged in position for casting or catapulting the fishing line.

Figure 2 is a longitudinal sectional view of my invention, illustrating the parts in position for releasing the fishing line therefrom at the termination of the casting or catapulting operation.

Figure 3 is a top plan view of my invention.

Figure 4 is a detail sectional view taken on the line 4—4 of Figure 1.

My invention, which facilitates the casting or catapulting of a fishing line from a rod, comprises a body 4 fashioned on one end with a hollow shank 5 frictionally engaging a reduced end of a fishing rod 6 and the opposite end formed with a widened section 7 of a substantially U-shaped configuration in cross section. Said section 7 constitutes the outer or releasing end portion of the device. The outer end of said section 7 is formed with a transverse slot 8 which extends slightly downwardly towards the under face of said extension and open on the side adjacent the outer end.

A latch member 9 is pivoted, by means of a pin 10, at the rear end of the section 7 between the sides thereof and extends beyond the outer end of said section as clearly illustrated in the drawing. The latch member is cut away, adjacent its midsection, to form an abutment 11 for cooperation with the open side of the slot 8 to provide a substantially rectangular shaped aperture 12 when said latch member is normally held in closed position by a light compression spring 13. The inner end of the spring 13 is slidably mounted within a recess 13a formed in the section 7 and the front end of the spring is fixed within a slot 13b formed in the rear end of the member 9 above the pin 10.

The outer end of the latch member is fashioned with a right angularly disposed section 14 extending beyond the U-shaped extension 7 and has a substantially oblong loop of wire 15 soldered to the end thereof and which lies in a plane at right angles to said section 14. Said wire 15 at the rear end thereof is soldered as at 15a to the cross arm of a wire yoke 16, the side arms of which extend upwardly about the section 7 and terminate in right angularly disposed end portions soldered as at 16a within the slot formed in the upper face of the latch member 9 adjacent the rear end of the latter.

In use, a fishing line A or the like is provided with a loop B spaced above the hook and sinker leaders and said loop B is trained through the wire loop 15 and one end of the loop B is trained through the aperture 12 with the latch member 9 held in closed position by the spring 13. When the line is thus arranged, it is in position for casting. Upon casting or catapulting of the rod, the sinker C on the end of the line will be pivoted upwardly over the outer end of the device thus causing a section of the line adjacent the loop B to engage the wire 15 and actuate the latch 9 to open position and thereby liberate the loop B of the line A from within said latch and permit the end of the line to be projected in the usual manner.

It is obvious that the invention is not confined to the herein described use therefore as it may be utilized for any purpose to which it is adaptable. It is therefore to be distinctly understood that the invention is not limited to the specific construction as illustrated and described, as the same is only illustrative of the principles of operation which are capable of extended application in advance forms, and that the invention comprehends all construction within the scope of the appended claims.

What I claim is:

1. A casting device adapted for connection to the end of a casting rod, said device comprising a body formed on one end with an outwardly extending slot, a spring pressed latch member pivoted to said body and normally closing said slot, and a line engaging element mounted on said latch member, and pivotally connected to said device and adapted to be engaged by a casting line having a loop positioned in said slot and actuated by said line to move said latch member to permit release of said loop from within said slot upon termination of catapulting motion of said device.

2. A device of the character described, comprising, a body fashioned at one end with a shank adapted to be secured to the end of a casting rod and on the opposite end with a transverse slot having an open side, a latch member pivotally connected to said opposite end and having a section normally closing the open side of said slot, and a loop secured to said latch member and adapted to receive therethrough the loop of a line trained through said slot and held therein by said latch, said latch member being engageable by said line and operable thereby upon catapulting of said rod to open the side of said slot to permit projecting of said loop and line from said body.

3. A device of the character described, comprising, a body fashioned at one end with a shank adapted to be secured to the end of a casting rod and on the opposite end with a transverse slot having an open side, a latch member pivotally connected to said opposite end and having a section normally closing the open side of said slot, a loop secured to said latch member and adapted to receive therethrough the loop of a line trained through said slot and held therein by said latch member, said latch member being engageable by said line and operable thereby upon catapulting of said rod to open the side of said slot to permit projecting of said loop and line from said body, and a spring carried by said body and engaging said latch member to normally maintain the latter in position to effect closing of the open side of said slot.

WILLIAM L. TAYLOR.